Jan. 31, 1956 W. I. STEARNS 2,732,869
DRILL BIT FOR SCREW HOLES
Filed April 3, 1953
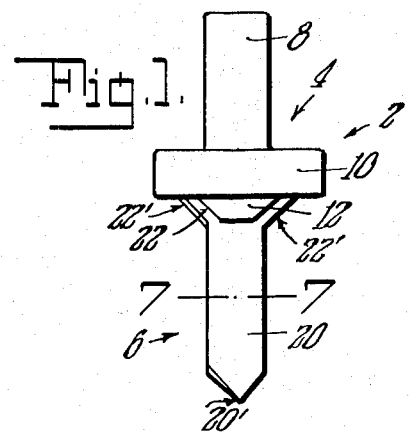
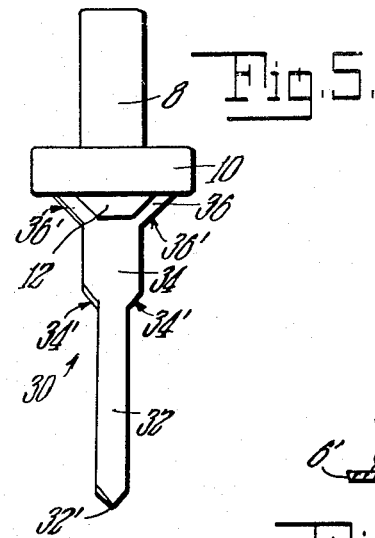
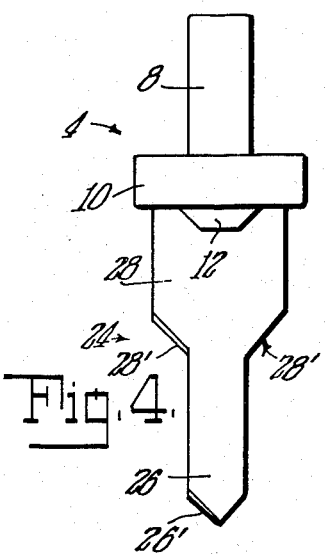
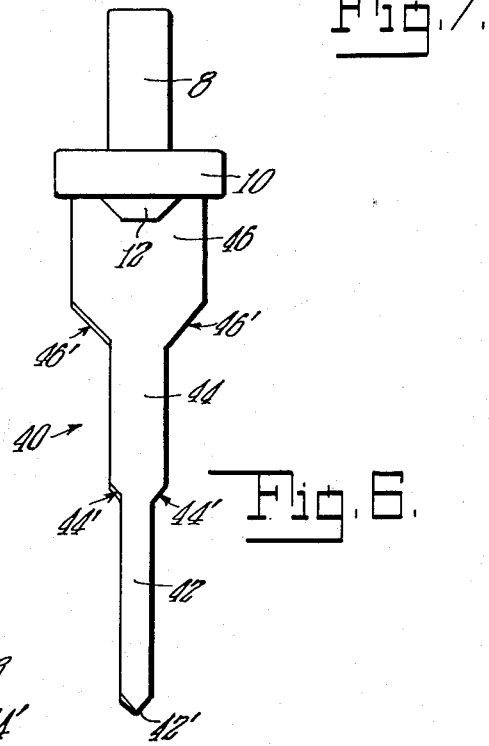
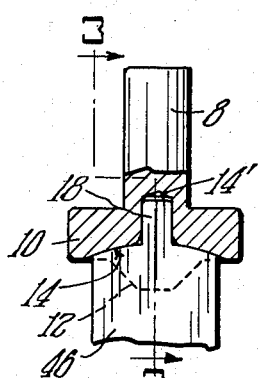
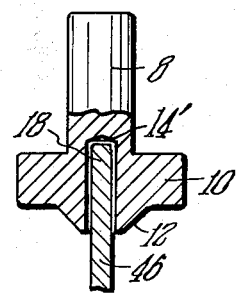
INVENTOR.
Walter I. Stearns.
BY United States Patent Office 2,732,869
Patented Jan. 31, 1956

2,732,869
DRILL BIT FOR SCREW HOLES
Walter I. Stearns, Arlington, Vt.
Application April 3, 1953, Serial No. 346,730
1 Claim. (Cl. 145—125)

This invention relates to improvements in wood working tools and is directed to improvements in tools for boring holes for wood screws.

The principal objects of the invention are the provision of a boring tool which is adapted to form holes in wood for screws.

According to novel features of the invention, the tool is arranged to simultaneously form a hole for the threaded end portion of a screw, the unthreaded body thereof and at the same time form a countersink bore for the head. Or, if desired, it is possible to provide a hole for the body portion of a wood screw and a counter bore for the head.

In a general way, various forms of the tool may be used for various purposes and the tool is constructed and arranged for rigidity and long life as well as for efficiency in operation.

All of the above objects I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claim hereunto annexed and more fully described and referred to in connection with the accompanying drawings wherein:

Fig. 1 is a side elevational view of a tool embodying the novel features of the invention;

Fig. 2 is a longitudinal elevational view through the head portion of the tool;

Fig. 3 is a sectional elevational view on the line 3—3 of Fig. 2;

Figs. 4, 5, and 6 are views similar to Fig. 1 showing other forms of the tool of the invention; and Fig. 7 is a sectional view on the line 7—7 of Fig. 1.

Referring now to the drawings more in detail, the invention will be fully decsribed.

The tool 2 as shown in Fig. 1 includes a head portion 4 and a blade 6 fixed thereto and depending therefrom.

The head 4 includes a shank 8, suitable for engagement by a chuck or the like for rotating the tool, which extends upwardly from a flange 10. The blade 6 is secured in the head as shown in Figs. 2 and 3.

The head 10 has a portion 12 depending therefrom and said head is provided on its lower side with an upwardly extending slot 14 extending transversely thereacross. A hole 14' extends upwardly from the slot axially of the shank.

The upper end of the blade 46 extends upwardly into the slot and a stem 18 on its upper end extends into the hole 14'. The upper end of the blade and stem thereof fit snugly in the slot and hold as by a press fit so that the blade and head are firmly secured together against separation.

In each form of the invention the blade and head are similarly secured together. The portion 12 of the head in the form of a hub functions to reinforce and support the upper end of the blade.

In Fig. 1 the blade 6 has a lower portion 20 for boring a hole for the upper unthreaded body portion of a wood screw and a portion 22 for countersinking for the head of a screw.

In Fig. 4 a blade 24 has a lower portion 26 for boring a hole for the body portion of a screw and an upper elongated portion 28 for boring a deep countersink so that the head of a screw may be disposed well below the surface of the work.

In Fig. 5 a blade 30 has a lower portion 32 for boring for the threads of a screw, an intermediate portion 34 for the upper unthreaded body portion of a screw and an upper portion 36 for countersinking for the head of a screw.

In Fig. 6, a blade 40 has a lower portion 42 for the threaded portion of a screw, an intermediate portion 44 for the upper unthreaded body portion of a screw and an upper portion 46 for boring a deep countersink for the head of a screw.

The blades in all cases are formed from strip steel which will be suitable and they may be made from steel which may or may not be heat treated depending upon the nature of the steel. In any case, the blades may be formed with a longitudinally extending twist therein, if desired.

When desired, the opposite longitudinal substantially parallel edges of the blades will be formed for the most efficient cutting action in wood and as shown in Fig. 7 the said edges 6 may be angularly disposed for clearance.

As is well known, flat head wood screws have a lower threaded portion, an upper unthreaded body portion and the underside of the head converges or inclines inwardly and downwardly.

Lowermost portions 20' of the blade 6 of Fig. 1 are formed for a boring or cutting action as are sides 22' of the upper countersink portion 22.

Likewise the lower portion 26' of blade 24 of Fig. 4 are formed for boring and edge portions 28' are formed to shape a counterbore.

In Fig. 5 portions 32', 34' and 36' are formed for cutting and in Fig. 6 there are similar portions or edges 42', 44' and 46'.

The blades are formed so that in a single operation it is possible to bore a hole for the body of a screw and form a countersink for the head thereof, or it is possible to provide a hole for the screw body and form a deep counterbore for the head of the screw.

In another case, it is possible to bore a hole for the threaded part of a screw, a hole for the non-threaded body thereof and form a countersink for the screw head. In another case, as in Fig. 6, it is possible to form a deep counterbore.

The tool may be engaged in the chuck of a bit stock or by the chuck of a drilling tool. The tool is adapted for high speed operation and being flat and relatively thin there is adequate clearance for chips so that drilling operations may be accomplished efficiently and swiftly.

As stated, if desired the body may be twisted to some extent and the cutting edges will be formed for the most efficient cutting action.

As will be observed, the tool blade is formed as a flat strip and is accomplished by blanking from stock of the desired thickness.

As a novel feature of the invention, the blank after forming is coined, so-called. That is, subjected to pressure between plates. This operation insures a flat blank and overcomes any upwardly extending edges there may be so as to provide sharp cutting edges at longitudinal sides of the blade. Also the pressing is such that the lower end of the blade is slightly thicker by a few thousandths of an inch than the upper end and the blade is slightly wider by a few thousandths at the upper than at the lower end.

The resulting blade has sharp cutting edges and thins out gradually and widens gradually in transverse width from the lower to upper end and not only cuts rapidly but provides clean sharp holes and countersinks.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

A wood drill construction comprising in combination, an upper head including a flange and an elongated stem extending upwardly therefrom, said flange having a transverse blade receiving slot in the lower side thereof and an axial stem socket extending upwardly from said slot, hub portions depending from the lower sides of said slot for engaging opposite sides of a blade, an elongated relatively thin flat blade having an upper end portion in the slot of the said flange and between said hubs and a stem in said socket, said blade having lower pointed and intermediate and upper portions of relatively increasing transverse widths for the threaded and body and head portions of a screw, said blades upwardly from said pointed end to said upper end decreasing in thickness by a few thousandths of an inch and the transverse widths of the portions thereof increasing upwardly from said pointed end by a few thousandths of an inch, and opposite side edges of the lower and intermediate and upper portions of the blade being sharpened and out of parallelism only to the extent of the few thousandths of increasing width.

References Cited in the file of this patent

UNITED STATES PATENTS

| | | |
|---|---|---|
| 60,207 | Lewis | Dec. 4, 1866 |
| 104,335 | Monson | June 14, 1870 |
| 2,543,206 | Smith | Feb. 27, 1951 |
| 2,655,964 | Labbee | Oct. 20, 1953 |